July 20, 1965  G. R. P. MARIÉ  3,196,371
DELAY DISTORTION COMPENSATOR
Filed May 1, 1961  5 Sheets-Sheet 1
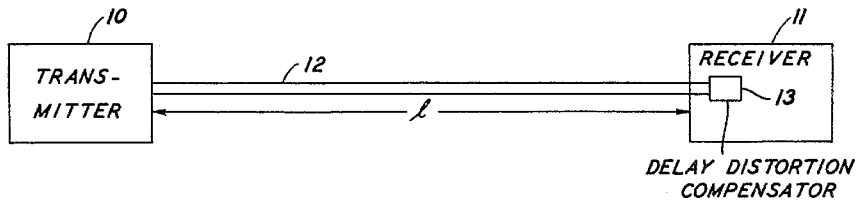
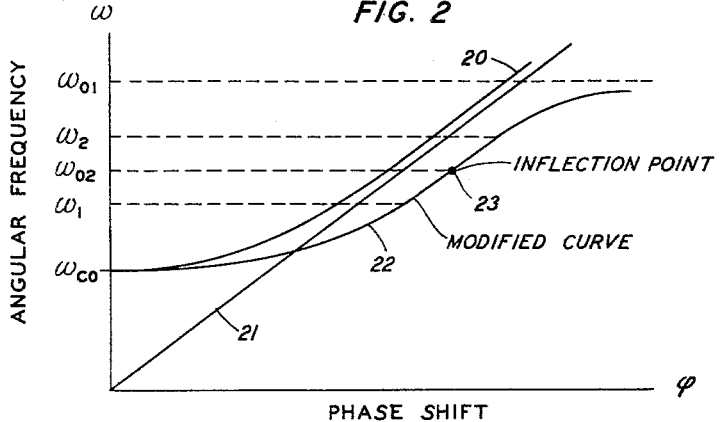
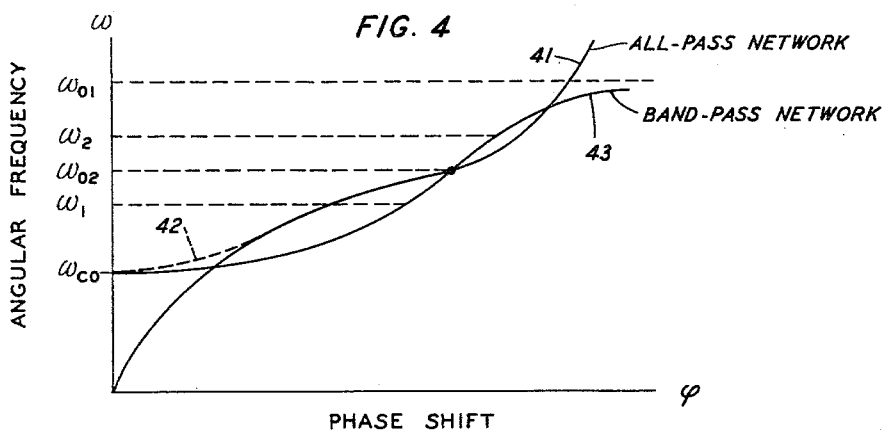
INVENTOR.
G. R. P. MARIÉ
BY
*Tylran Sherman*
ATTORNEY July 20, 1965 G. R. P. MARIÉ 3,196,371
DELAY DISTORTION COMPENSATOR
Filed May 1, 1961 5 Sheets-Sheet 2

INVENTOR.
G.R.P. MARIÉ
BY
ATTORNEY

July 20, 1965 G. R. P. MARIÉ 3,196,371
DELAY DISTORTION COMPENSATOR
Filed May 1, 1961 5 Sheets-Sheet 3

EXPLANATORY FIGURE

EXPLANATORY FIGURE

INVENTOR.
G.R.P. MARIÉ
BY
*Sylvan Sherman*
ATTORNEY

July 20, 1965 G. R. P. MARIÉ 3,196,371
DELAY DISTORTION COMPENSATOR
Filed May 1, 1961 5 Sheets-Sheet 4

INVENTOR.
G.R.P. MARIÉ
BY
*Sylvan Sherman*
ATTORNEY

July 20, 1965   G. R. P. MARIÉ   3,196,371
DELAY DISTORTION COMPENSATOR
Filed May 1, 1961   5 Sheets-Sheet 5
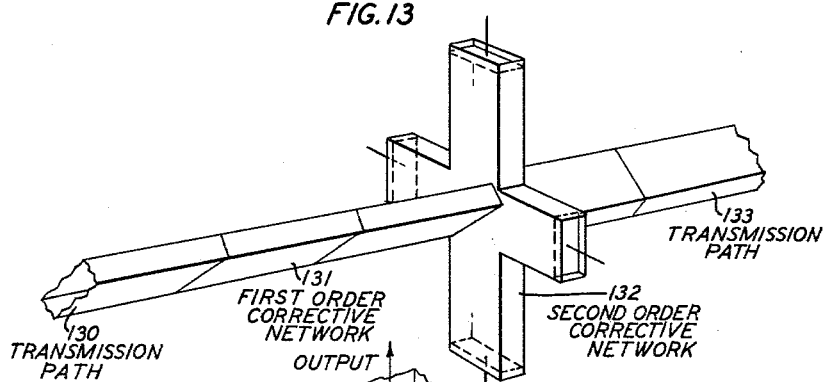
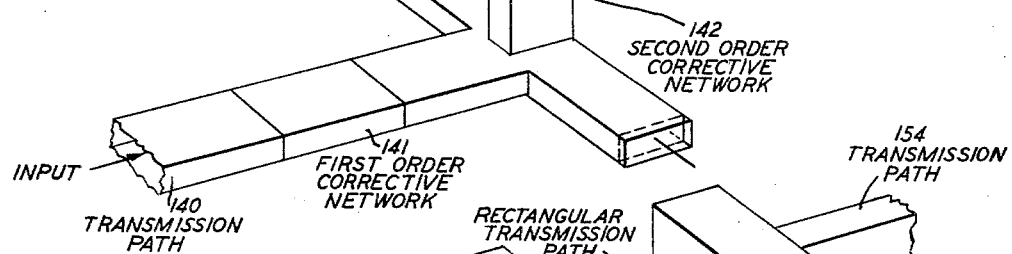
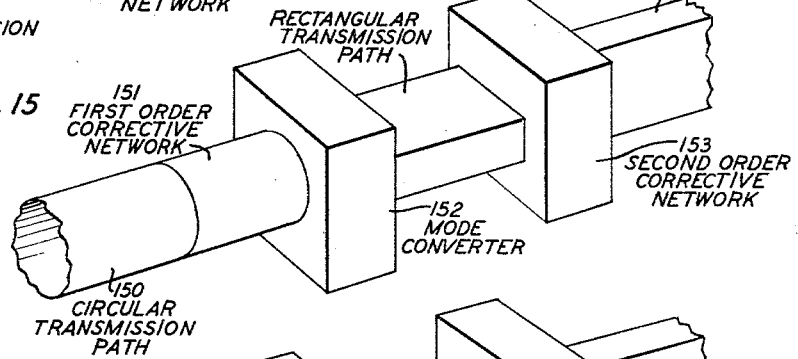
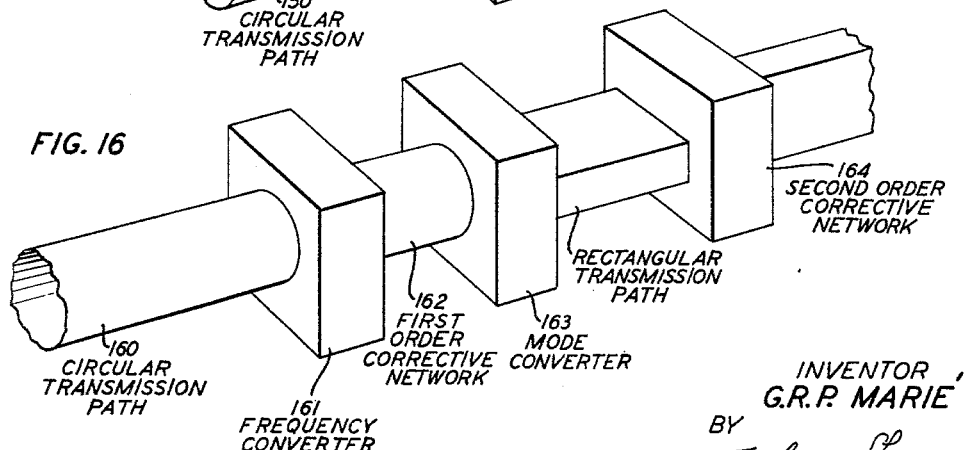
INVENTOR,
G.R.P. MARIÉ
BY
Sylvan Sherman
ATTORNEY

3,196,371
DELAY DISTORTION COMPENSATOR
Georges R. P. Marie, Red Bank, N.J., assignor to Bell Telephone Laboratories, Incorporated, New York, N.Y., a corporation of New York
Filed May 1, 1961, Ser. No. 106,634
11 Claims. (Cl. 333—28)

This invention relates to electromagnetic wave transmission systems and in particular to delay distortion compensators for use in such systems.

It is well known that in high frequency transmission systems, waves of different frequencies do not propagate at the same velocity. For example, in the transmission of a broadband microwave signal over long distances through a waveguide, the higher frequencies travel at a greater group velocity than the lower frequencies. If uncorrected, this difference in group propagation velocity gives rise to perceptive and, in some cases, to serious distortion of the signal. The resulting distortion, termed "delay distortion," can be corrected by suitably delaying the faster propagating frequency components with respect to the slower propagating frequency components. The difficulty, however, is in obtaining a corrective network which is both simple in structure and which adequately compensates over the frequency range of interest.

According, it is the broad object of this invention to selectively delay high frequency wave energy over a broad range of operating frequencies in a simple manner to correct the delay characteristic of a transmission system.

Typically, a waveguide is a high-pass network whose frequency versus phase shift characteristic is a monotonically varying function. The delay distortion of a network is given by the higher (second, third, et cetera) order derivatives of its frequency-phase characteristic. Since the higher order derivatives of a monotonic function of the type mentioned above are all finite over a given frequency range of interest, it is evident that a waveguide has a tendency to produce delay distortion and even though the distortion may be small per unit length of waveguide, for long distance transmission systems these small increments become appreciable.

It is, accordingly, a further object of this invention to modify the frequency-phase characteristic of a transmission system over a given frequency band of interest in a manner to reduce the amplitude of the higher order derivatives of said characteristic within the given band of interest.

In accordance with the invention correction of the first order delay distortion of a transmission system is achieved by modifying the frequency-phase characteristic of the transmission system from that of a high-pass network to that of a band-pass network by the inclusion within the system of a corrective network having a stop-band. The effect of this modification is to create a point of inflection in the frequency-phase characteristic of the over-all transmission system within the pass band of the stop-band network. At the frequency at which the point of inflection is made to occur, the first order delay distortion (given by the second derivative of the modified frequency-phase characteristic) is zero. For small deviations of frequency about the point of inflection, the first order delay distortion is relatively small compared to the first order delay distortion of the uncorrected transmission system.

The term "stop-band" as used herein shall be understood to define a portion of the frequency spectrum over which propagating wave energy is highly attenuated. Thus defined, a "stop-band network" includes such well-known networks as a low-pass network for which the stop-band would include the entire frequency spectrum above the high cut-off frequency of the network; a band-rejection network for which the stop-band includes those frequencies within the rejected band; and a band-pass network for which the stop-band of interest consists of those frequencies above the high cut-off frequency of the network.

In a preferred embodiment of the invention, first order delay distortion compensation is provided by a helicoidal structure disposed in a section of rectangular waveguide. The helicoidal structure, comprising a length of conductive wire wound in a substantially helical form on a cylindrical core of low-loss dielectric material, is longitudinally distributed along the waveguide a distance which depends upon the magnitude of the delay distortion to be corrected.

An advantage of the helicoidal arrangement described above resides in its structural simplicity and electrical uniformity. The helicoidal structure, however, is not the only type of corrective network which can be used. For example, a comb structure consisting of a plurality of transversely extending conductive posts longitudinally distributed along the waveguide can alternatively be used. In a circular cylindrical waveguide system transmitting the $TE_{01}$ circular electric mode, a plurality of I-shaped conductive members circularly distributed around the interior of the waveguide can be used as will be explained in greater detail hereinafter.

While the modification of the frequency-phase characteristic of the transmission system described above effectively minimizes the first order delay distortion, there may still remain a significant second order term. The latter can be the result of second order delay distortion produced by the transmission system or it may result from the first order compensator described above or from both these sources. Where the second order delay distortion becomes appreciable, a second and distinct compensating network is inserted into the transmission system. The second compensator, however, in addition to reducing the over-all second order delay distortion must leave undisturbed the optimization of the first order delay distortion produced by the first compensator.

In accordance with the invention, second order phase delay correction is obtained by means of an all-pass network inserted in cascade with the stop-band network comprising the first compensator. An all-pass network, typically, has an inherent inflection point which is distinguished from the inflection point of a band-pass network in that it occurs at a point of minimum slope of the frequency-phase characteristic rather than at a point of maximum slope, typical of the band-pass characteristic. As such, the third derivative of the frequency-phase characteristic of the all-pass network at its inflection point has a sign which is opposite to that of the sign of the third derivative of the frequency-phase characteristic of a band-pass network at its inflection point. Accordingly, the third derivatives of these two networks can be adjusted to cancel each other, thereby minimizing the second order delay distortion of the over-all network. Furthermore, since the second derivative of the frequency-phase characteristic of the all-pass network is zero at the point of inflection, the inclusion of such a network does not disturb the optimization of the first order delay distortion produced by the first delay distortion compensator.

As mentioned previously, a waveguide has an inherent low cut-off frequency that is substantially higher than zero frequency. If, therefore, the second order delay corrective network is incorporated within a waveguide, it is apparent that the descriptive term "all-pass network"

is not strictly accurate in that the waveguide will not propagate wave energy below its cut-off frequency. However, if the low cut-off frequency is well below the frequency band of interest and if the network still retains the essential variation in slope mentioned above, the low cut-off frequency is of no consequence. Accordingly, the term "all-pass network" as used herein shall be understood to include any network having an inflection point in its frequency-phase characteristic which occurs at a point of minimum slope.

In a preferred embodiment of the invention, second order delay distortion compensation is provided by a bridge circuit having one pair of opposite arms comprising substantially identical series resonant tuned circuits and a second pair of opposite arms comprising substantially identical parallel resonant tuned circuits. All four arms are adjusted to be simultaneously resonant at a frequency within the given band of interest. In a typical waveguide transmission system such arms comprise resonant stub sections coupled to the transmission path.

These are other objects and advantages, the nature of the present invention, and its various features, will appear more fully upon consideration of the various illustrative embodiments now to be described in detail in connection with the accompanying drawings in which:

FIG. 1 diagrammatically illustrates a long distance guided communication system in which the factor of delay distortion is important;

FIG. 2, given for purposes of illustration, shows the relationship between the phase shift and the angular frequency of a typical waveguide transmission system, and a modified phase shift-frequency curve of a transmission system corrected to minimize first order delay distortion;

FIG. 3 is a perspective view of a helicoidal structure for correcting first order delay distortion;

FIG. 4, given for purposes of illustration, shows a phase shift-frequency curve of an all-pass network for correcting second order delay distortion and a modified phase shift-frequency curve of a transmission system corrected to minimize first order delay distortion;

FIGS. 13 through 16 illustrate the various ways in which the corrective networks can be incorporated into a transmission system.

Figure 3:
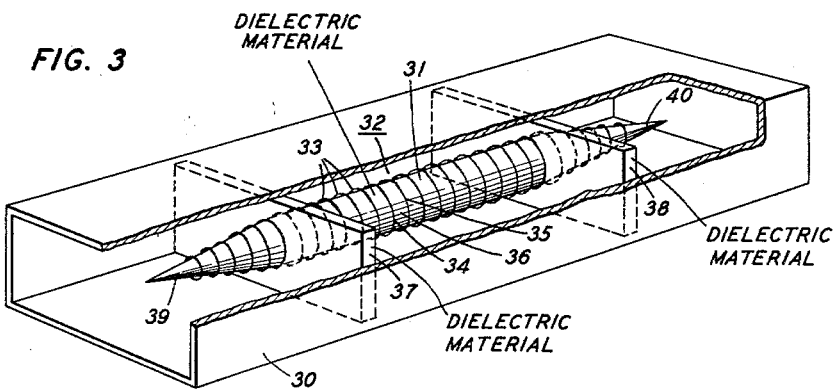

Referring more specifically to FIG. 1, there is shown a portion of a typical long distance guided wave transmission system in which the invention might be used. Such a system is characterized as long so as to define a situation in which the factor of delay distortion becomes important. The system comprises a pair of terminal stations 10 and 11 which are illustrated as a transmitter and a receiver, respectively, and a long distance guided wavepath 12 of length $l$ connecting the two stations. Wavepath 12 can be any type of waveguide structure such as, for example, a circular cylindrical waveguide propagating the $TE_{01}$ circular electric mode. It is understood, however, that the invention is equally applicable to any wave transmission system having a frequency-phase characteristic of the type to be described in greater detail below.

At the receiver 11 there is inserted a delay distortion compensator 13 of a type to be described in greater detail hereinafter, to correct for the delay distortion introduced by the length of wavepath $l$. While only one delay distortion compensator is shown in FIG. 1, it is understood that if the length of wavepath 12 is sufficiently long, additional compensators can be inserted at suitable intervals along path 12.

In the system illustrated in FIG. 1, it is assumed that the signal is transmitted along wavepath 12 over a frequency range $f \pm df$. In addition, the compensator 13 is shown as being directly connected to the wavepath 12. However, the compensator can be connected after a frequency converter so that the delay distortion correction is made at a frequency F different than the frequency $f$ at which the wave energy is propagated along wavepath 12. Furthermore, if wavepath 12 supports a plurality of channels at frequencies $f_1, f_2 \ldots f_n$, compensators can be provided after channel separation for each of the several channels. It should also be noted that compensation can be performed in either the mode in which the signal is transmitted over wavepath 12 or in a different mode.

Referring to FIG. 2, curve 20 shows, for the purposes of explanation, the variation in phase shift $\varphi$ as a function of the angular frequency $\omega$ for a typical waveguide transmission path. Below the cut-off frequency, indicated by $\omega_{co}$, there is no propagation and $\varphi$ is equal to zero. Immediately above cut-off, $\varphi$ increases rapidly, gradually tapering off over the region of practical operation between $\omega_1$ and $\omega_2$. At higher frequencies, curve 20 approaches curve 21 asymptotically. Curve 21 is a straight line which passes through the origin and has a slope $$\frac{d\omega}{d\varphi}$$

equal to $c$, the velocity of light.

Expressing $\varphi$ in terms of the guide wavelength $\lambda_g$ of a monochromatic wave gives $$\varphi = \frac{2\pi l}{\lambda_g} \quad (1)$$

The time delay $\Delta T$ experienced by the signal propagating over the wavepath is given by the derivative of the phase shift with respect to the angular frequency $\omega$ as $$\Delta T = \frac{\partial \varphi}{\partial \omega} = \frac{\partial \left(\frac{1}{\lambda_g}\right) l}{\partial f} \quad (2)$$

Expressing $\lambda_g$ in terms of the frequency $f$ and the cut-off frequency $f_{co}$ and noting that $f\lambda = c$ where $\lambda$ is the free space wavelength and
$c$ is the velocity of light, we obtain $$\Delta T = \frac{\partial \varphi}{\partial \omega} = \frac{l}{c} \frac{\lambda_g}{\lambda} \quad (3)$$

If the group velocity $v_g$ given by the slope of the $\omega$-$\varphi$ curve was constant for all frequencies or, at least, for all frequencies over the operating range, the delay $\Delta T$ (which is the reciprocal of the group velocity) for all frequencies would be constant and there would be no dispersion of the wave. However, as is obvious from curve 20, this is not so. As a result, the delay experienced by each of the frequency components making up the signal is different. The delay distortion is a measure of the variation of the delay with frequency, and is given in terms of a Taylor series, the first two terms of which are $$\delta \Delta T = \frac{\partial \Delta T}{\partial f} df + \frac{1}{2!} \frac{\partial^2 \Delta T}{\partial f^2} (df)^2 \quad (4)$$

Performing the indicated operations on Equation (3), the total delay distortion $\delta \Delta T$ for a length of guide $l$ is $$\delta \Delta T = \frac{l}{c} \frac{\lambda_g^3}{\lambda \lambda_{co}^2} \frac{df}{f} + \frac{3l}{2c} \frac{\lambda_g^5}{\lambda^3 \lambda_{co}^2} \left(\frac{df}{f}\right)^2 \quad (5)$$

For a 50 ±.15 kilomegacycle per second wave propagating in the $TE_{01}$ mode in a two-inch round waveguide whose cut-off frequency is 7.2 kilomegacycles per second, the first order delay distortion is 0.33 millimicrosecond per mile, while the second order delay distortion is less than one-half of a percent of this value.

To compensate for the delay distortion of the wavepath, there is introduced into the transmission system a stop-band network having a band-pass region which includes the range of frequencies between $\omega_1$ and $\omega_2$ and for which the stop-band extends over a range of frequencies above $\omega_2$. By the inclusion of the stop-band network, the transmission path is converted from a high-pass device to a band-pass device. This has the effect of modifying the frequency-phase characteristic of the system and, in particular, it introduces a point of inflection in the over-all $\omega-\varphi$ curve at which point the second derivative, $$\frac{\partial^2 \varphi}{\partial \omega^2}$$

is zero. This is indicated in FIG. 2, where a modified phase shift curve 22 is shown having a point of inflection 23 in the interval between $\omega_1$ and $\omega_2$. A modified $\omega-\varphi$ of this type can be realized by introducing into the wavepath a distributed series resonant circuit having a resonant frequency $\omega_{01}$ greater than $\omega_2$. Illustrative of one arrangement for achieving the desired modification of the $\omega-\varphi$ characteristic is the embodiment illustrated in FIG. 3.

FIG. 3 shows a first order delay distortion compensator comprising a section of wavepath which, for purposes of illustration, consists of a hollow, conductively bounded rectangular waveguide 30 whose wide and narrow dimensions are proportioned to support the dominant $TE_{10}$ rectangular guide mode over the frequency range of interest. It is understood, however, that this is in no way intended to limit the invention to this particular type of wavepath.

Located within waveguide 30, and longitudinally disposed along the guide axis, is a cylindrical core 31, advantageously of circular cross-section, of low-loss dielectric material upon which there is wound the helix 32. Helix 32 consists of a length of conductive wire 33 wound in a substantially helical form. Adjacent turns of the helix, such as turns 34 and 35, are conductively insulated from each other, and this can be accomplished by means of a small air gap such as 36. The pitch distance of the helix, i.e., the distance between centers of adjacent turns, should be as small as possible consistent with the above-mentioned insulating requirement. This distance in all events should be less than one-quarter wavelength. Preferably, six to ten turns per wavelengths of the highest frequency of interest should be used.

The helicoidal structure is symmetrically supported within guide 30 by means of low-loss dielectric members such as 37 and 38 suitably distributed therealong. In addition, conical transition end extensions 39 and 40 of core 31 can be included to cut down reflections from the helicoidal structure and, advantageously, the helix 32 is wound over the transition ends as shown.

The helicoidal structure of FIG. 3 is the equivalent of a distributed series resonant circuit whose resonant frequency is a function of the radius of the helix, the size of the wire and the dielectric constant of the dielectric core. In the following analysis, the parameters of the network will be determined to produce the required delay correction.

The general form of Maxwell's equations in free space can be written as $$\nabla \times E + \mu_0 \frac{\partial H}{\partial t} = 0$$
$$\nabla \times H - \epsilon_0 \frac{\partial E}{\partial t} = J \quad (6)$$

For a wave at a single frequency $\omega$, the conduction current $J$ flowing through the equivalent series resonant circuit introduced by the helicoidal structure is $$J = \frac{E}{Z} = \frac{j \omega \epsilon_0 b E}{1 - \left(\frac{\omega}{\omega_{01}}\right)^2} \quad (7)$$

where:

$\omega_{01}$ is the resonance angular frequency of the helicoidal structure,
$b$ is a dimensionless number
$\epsilon_0$ is the dielectric constant of free space
and
$b\epsilon_0$ is the capacity per unit of length of the helicoidal structure.

Substituting Equation (7) in Equation (6) we get $$\nabla \times E + j\omega\mu_0 H = 0$$
$$\nabla \times E - j\omega\epsilon' \epsilon_0 E = 0 \quad (8)$$

where $\epsilon'$, the relative dielectric constant of the wavepath in the region of the relicoidal structure, is given as $$\epsilon' = 1 + \frac{b}{1 - \left(\frac{\omega}{\omega_{01}}\right)^2} \quad (9)$$

It is a relatively simple matter to calculate $\epsilon'$ from measurements made of the helicoidal structure with a sliding probe and a wavemeter by using the formula $$\epsilon' = \left(\frac{\lambda}{\lambda_{co}}\right)^2 + \left(\frac{\lambda}{\lambda_g}\right)^2 \quad (10)$$

where:

$\lambda_{co}$ is the guide cut-off wavelength
$\lambda$ is the free space wavelength of the frequency at which the measurement is made,
and
$\lambda_g$ is the guide wavelength at that frequency.

To evaluate $b$ and $\omega_{01}$, Equation (9) is rewritten as $$\omega^2_0(\epsilon' - 1 - b) = \omega^2(\epsilon' - 1) \quad (11)$$

or as $$\omega^2_0(x - b) = y \quad (12)$$

where:

$$y = (\epsilon' - 1)$$

and:

$$y = (\epsilon' - 1)\omega^2$$

By plotting the points $x$ and $y$, obtained from measurements, on cartesian coordinates, an approximate straight line is obtained. It is then easy to smooth graphically in order to obtain a straight line from which $b$ and $\omega_{01}$ are deduced with good accuracy.

If a standard rectangular waveguide is used having a cut-off frequency, when empty, of about two-thirds the operating frequency, and if the resonant frequency of the helicoidal structure is about ten percent in excess of the operating frequency, the guide wavelength is essentially that imposed by the helicoidal structure and the cut-off frequency of the empty guide is of negligible importance.

For a length of helix $l_1$, the total phase shift of the helicoidal structure is $$\varphi = \frac{2\pi l_1}{\lambda_g} = \frac{2\pi l_1 \sqrt{\epsilon'}}{\lambda} \quad (13)$$

However:

$$\frac{2\pi}{\lambda} = \frac{\omega}{c} \quad (14)$$

Substituting Equations (14), and (9) in (13) gives $$\varphi = \frac{\omega l_1}{c}\sqrt{1+bx} \quad (15)$$

where:

$$x = \frac{1}{1-\left(\frac{\omega}{\omega_{01}}\right)^2} \quad (16)$$

The derivative of $\varphi$ with respect to $\omega$ gives the delay $$\Delta T = \frac{\partial \varphi}{\partial \omega} = \frac{l_1}{c}\frac{(1+bx^2)}{(1+bx)^{1/2}} \quad (17)$$

The delay distortion is given by the series $$\delta \Delta T = \frac{\partial \Delta T}{\partial F}dF + \frac{1}{2}\frac{\partial^2 \Delta T}{\partial F^2}(dF)^2 \cdots$$

where $F \pm dF$ is the frequency of the signal propagating past the helix.

Carrying out the indicated operations, the delay distortion of the first order, introduced by the helicoidal compensator, is $$\frac{\partial \Delta T}{\partial F}dF = \frac{dF}{2\pi}\frac{\partial^2 \varphi}{\partial F^2} = \frac{l_1}{c}\frac{dF}{F}\frac{b(x^2-x)(3bx^2+4x-1)}{(1+bx)^{3/2}} \quad (18)$$

The delay distortion of the second order is $$\frac{1}{2}\frac{\partial^2 \Delta T}{\partial F^2}(dF)^2 =$$

$$\frac{3l_1}{2c}\left(\frac{dF}{F}\right)^2\frac{b^2(x^2-x)[b^2x^3(5x-4)+2bx^2(6x-5)+8x^2-8x+1]}{(1+bx)^{5/2}}. \quad (19)$$

The first order term, given by Equation (18), must compensate the delay distortion caused by the wavepath. Thus, the sum of the expressions (18) and the first term of Equation (5) must be zero. This condition gives the ratio between the length of wavepath $l$ and the length $l_1$ of the helicoidal structure (over the signal bandwith $dF=df$) as $$\frac{l}{l_1} = \left(\frac{\lambda \lambda_c^2}{\lambda_g^3}\right)\left(\frac{f}{F}\right)\left(\frac{b(x^2-x(3bx^2+4x+1)}{(1+bx)^{3/2}}\right) \quad (20)$$

For $b$ large, $x$ greater than 1, and $\lambda_{co}$ small compared to $\lambda$, Equation (20) can be simplified to read $$\frac{l}{l_1} = \frac{3b^{1/2}f^3}{f_{co}^2 F}(x^2-x)x^{1/2} \quad (21)$$

It is also advantageous that the second order term given by Equation (19) be small compared to the first order term. The ratio of these terms is $$M = \frac{3}{2}\frac{dF}{F}\frac{b^2x^3(5x-4)+2bx^2(6x-5)+8x^2-8x+1}{(bx+1)(3bx^2+4x-1)} \quad (22)$$

A good approximation for Equation (22) is given by $$M = \left(\frac{5}{2}x-2\right)\frac{dF}{F} \quad (23)$$

As an example, if $dF = \pm .15$ Kmc. per second
$F = 11.2$ Kmc. per second
$f = 50$ Kmc. per second
$f_{co} = 7.2$ Kmc. per second and $x = 3$ the resonance frequency of the helix is, from Equation (16), $1.23F = 13.8$ kilomegacycles per second. From Equation (23), $M = 7.3$ percent, and from Equation (21)

$$\frac{l}{l_1} = 6{,}800 b^{1/2}$$

It appears reasonable to have a $b$ of approximately 16. This gives a length $l_1$, for the helicoidal compensator, of 2.5 inches per mile of wavepath.

Figure 5:
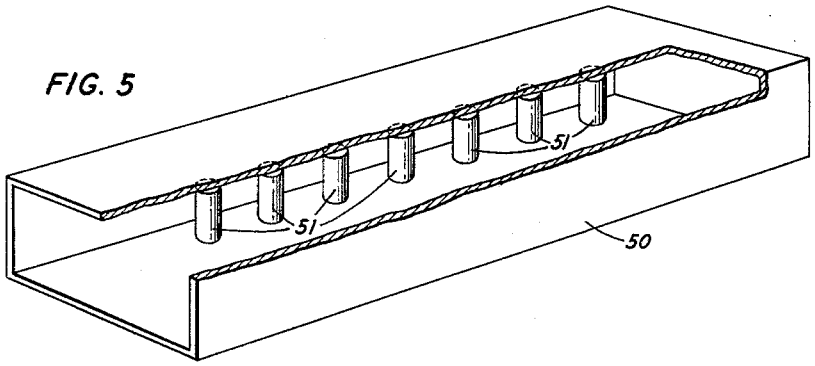
FIG. 5 is a perspective view of a comb structure for correcting first order delay distortion.
Figure 6:
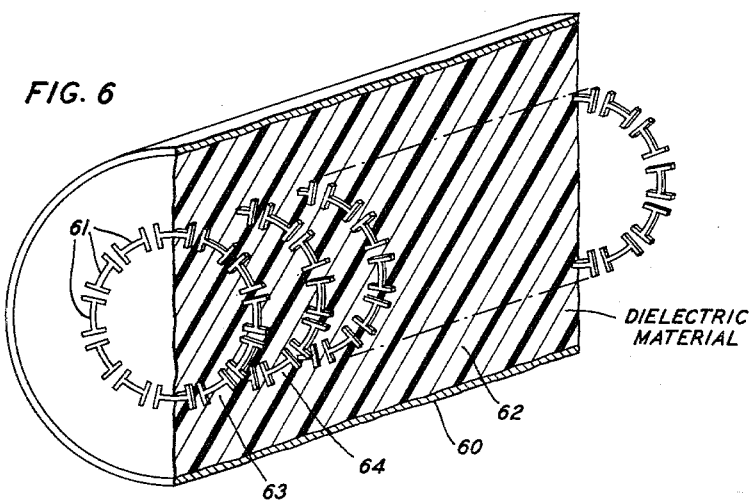
FIG. 6 is a perspective view of a delay distortion compensator for use in circular waveguides propagating the $TE_{01}$ mode.

FIGS. 5 and 6 illustrate a number of alternative compensator structures. FIG. 5 utilizes a section of rectangular waveguide 50 within which there is placed a plurality of transversely extending conductive posts 51 longitudinally distributed along the center of the wide dimension of guide 50. The posts are conductively connected to the upper wide guide wall and extend partially across guide 50 in the direction parallel to the narrow walls. Though conductively connected to one of the wide guide walls, the posts are otherwise conductively insulated from each other. The distance between centers of adjacent posts is made as small as possible consistent with the above-mentioned insulating requirement. This distance in all events should be less than one-quarter wavelength. Preferably six to ten posts per wavelength of the highest frequency of interest should be used. The diameter and the transverse length of each post are proportioned so that the comb-like structure formed by the posts is a distributed series resonant circuit whose resonant frequency is greater than the highest frequency within the band of interest. So proportioned, the embodiment of FIG. 5 functions in the manner of the helicoidal embodiment of FIG. 3.

The embodiment of FIG. 6 is intended for use in a circular cylindrical waveguide system supportive of the $TE_{01}$ circular electric mode and comprises a length of circular cylindrical waveguide 60 having a plurality of spaced, conductive I-shaped members 61 circularly distributed within the waveguide. In any given transverse plane normal to the guide axis, a plurality of these I members are distributed in a circle having a radius of approximately one-half the guide radius. The members are supported in a low-loss dielectric material 62. A plurality of these circular sections, such as 63 and 64, are longitudinally distributed along the wavepath. The longitudinal spacing between adjacent sections is as small as possible and in no event should be greater than one-quarter wavelength. Preferably six to ten circular sections per wavelength of the highest frequency of interest should be used. The size and spacing of the I members are adjusted to resonate the network at a frequency greater than the highest frequency within the given band of interest. So proportioned, the embodiment of FIG. 6 also performs as described above in connection with the helicoidal structure of FIG. 3.

While the second order delay distortion introduced by the length $l$ of transmission line is small, being less than one-half of one percent of the first order distortion (as calculated in the sample calculation given above), the second order delay distortion introduced by the helical compensator (as calculated above) is relatively large (7.3 percent). Accordingly, it may well be desirable to provide additional compensation in the system to minimize the net second order delay distortion of the compensated system.

A second compensator, however, in addition to introducing second order delay distortion of opposite sign (thereby correcting for the second order delay distortion introduced by the first compensator) should introduce no net first order distortion which would disturb the first order correction obtained with the helicoidal structure of FIGURE 3. These results are accomplished by inserting into the system an all-pass network whose $\varphi$-$\omega$ characteristic has a point of inflection within the band of interest. The $\varphi$-$\omega$ characteristic of such a network is illustrated by curve 41 in FIG. 4. The all-pass network, unlike the band-pass network illustrated by curve 43, passes all frequencies between zero and infinity. Furthermore, the variations in the slopes of curves 43 and 41 are distinctly different. For example, the slope of curve 41 decreases initially, reaching a minimum at a frequency $\omega_{02}$ within the band of interest (between $\omega_1$ and $\omega_2$) and then increases as the frequency increases. The slope of curve 43, on the other hand, reaches its maximum value at $\omega_{02}$. Accordingly, the third order derivatives for these two curves at their points of inflection are of opposite sign and, as such, can be adjusted to cancel each other. Thus, the all-pass network characterized by curve 41 satisfies the first requirement, i.e., that it be capable of minimizing the second order delay distortion introduced by the transmission line and the first compensator.

In addition, because the slope reaches its minimum value at the point of inflection, the second derivative of curve 41 is zero at $\omega_{02}$. Since the second derivative of the $\varphi$-$\omega$ characteristic is also a measure of the first order delay distortion of the network, an all-pass network of the type characterized by curve 41 satisfies the second requirement, i.e., that it not disturb the first order delay compensation of the first compensator.

Figure 7:
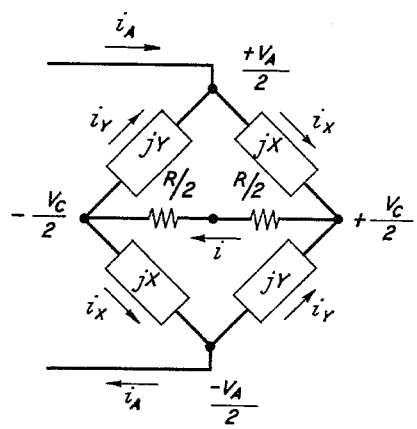
FIGS. 7 and 8 illustrate diagrammatically an all-pass bridge circuit for producing second order delay distortion compensation.

To this end, let us consider the bridge network shown in FIG. 7, and calculate the phase distortion produced by it. For the assumed directions of current flow, the following relationships exist:

$$V_C = R(i_X + i_Y) \qquad (24)$$

or:

$$V_C = \frac{R}{2}\left[\frac{V_A - V_C}{jX} + \frac{-V_A - V_C}{2Y}\right] \qquad (25)$$

from which:

$$\frac{V_A}{V_C} = \frac{Y+X}{Y-X} + j\frac{2XY}{R(Y-X)} \qquad (26)$$

In addition:

$$\frac{V_A}{I_A} = \frac{V_A}{i_X - i_Y} = \frac{V_A}{\frac{V_A - V_C}{2jX} - \frac{-V_A - V_C}{2jY}} \qquad (27)$$

Substituting from Equation (26), gives $$\frac{V_A}{i_A} = R\left[\frac{1 + j\frac{2XY}{R(X+Y)}}{1 - j\frac{2R}{X+Y}}\right] \qquad (28)$$

If we let:

$$Q = \frac{\sqrt{-XY}}{R} \qquad (29)$$

and:

$$\tan \mu = \sqrt{-\frac{X}{Y}} \qquad (30)$$

Equations (26) and (28) become $$\frac{V_A}{V_C} = \cos 2\mu - jQ \sin 2\mu \qquad (31)$$

and:

$$\frac{V_A}{i_A} = \sqrt{-XY}\left[\frac{1 - jQ \tan 2\mu}{Q - j \tan 2\mu}\right] \qquad (32)$$

Regarding the total resistance R as the output branch, the phase shift $\varphi$ between the input and the output of the network is given as $$\varphi = \arctan [Q \tan 2\mu] \qquad (33)$$

Figure 8:
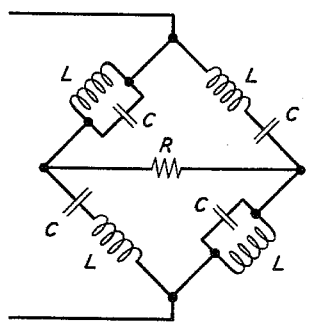

If, in addition, the impedance $jX$ and $jY$ are tuned circuits of capacitance C and inductance L as shown in FIG. 8, we have an all-pass network in which $$jX = j\left(L\omega - \frac{1}{C\omega}\right) \qquad (34)$$

$$jY = \frac{-j\frac{L}{C}}{L\omega - \frac{1}{C\omega}} \qquad (35)$$

$$Q = \frac{\sqrt{\frac{L}{C}}}{R} \qquad (36)$$

and:

$$\tan \mu = \frac{\omega}{\omega_{02}} - \frac{\omega_{02}}{\omega} \qquad (37)$$

where:

$$\omega_{02} = \frac{1}{\sqrt{LC}} \qquad (38)$$

Figure 9:
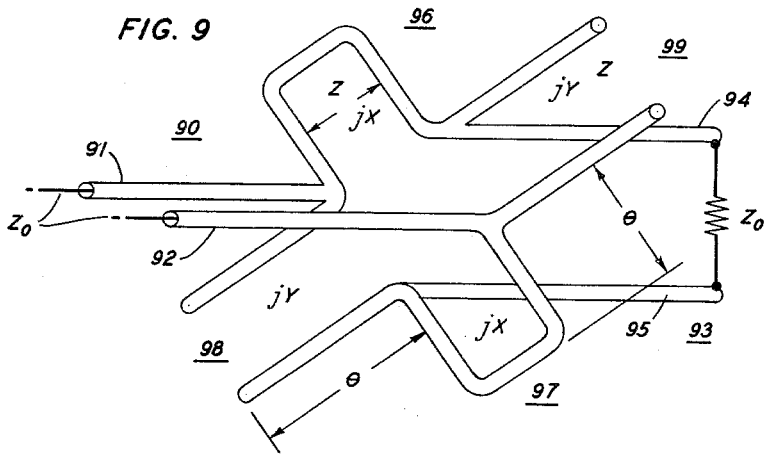
FIG. 9 is a two-wire transmission system equivalent of the bridge circuit of FIG. 8.

The two-conductor transmission line equivalent circuit of the bridge network of FIG. 8 is shown in FIG. 9 and comprises an input line 90 consisting of conductors 91 and 92, and an output line 93 consisting of conductors 94 and 95. Lines 90 and 93 have a characteristic impedance $Z_0$ and line 93 is shown terminated in its characteristic impedance $Z_0$.

A pair of shorted stubs 96 and 97 are connected between conductors 91 and 94 and between conductors 92 and 95, respectively. A pair of open ended stubs 98 and 99 are connected between conductors 91 and 95 and between conductors 92 and 94, respectively. Each of the stubs has a characteristics impedance Z and an electrical length $\theta$.

Comparing FIG. 8 and FIG. 9, it is seen that the output line 93 corresponds to R, shorted stubs 96 and 97 correspond to the bridge arms $jX$ and stubs 98 and 99 correspond to the bridge arms $jY$. From this we obtain $$jX = jZ \tan \theta \qquad (39)$$

$$jY = jZ \cot \theta \qquad (40)$$

$$\tan \mu = \tan \theta \qquad (41)$$

and:

$$Q = \frac{Z}{Z_0} \qquad (42)$$

To evaluate $\varphi$, as given by Equation (33), the electrical length $\theta$ of each stub is adjusted such that $2\theta$ is equal to $K\pi$ at frequency $F_0$, where K is an integer.

From (41) and (42) we get:

$$\varphi = \arctan [Q \tan 2\mu] = \arctan [Q \tan 2\theta]$$

$$\varphi = \arctan \left[\frac{Z}{Z_0} \tan 2\theta\right] \qquad (43)$$

Figure 10:
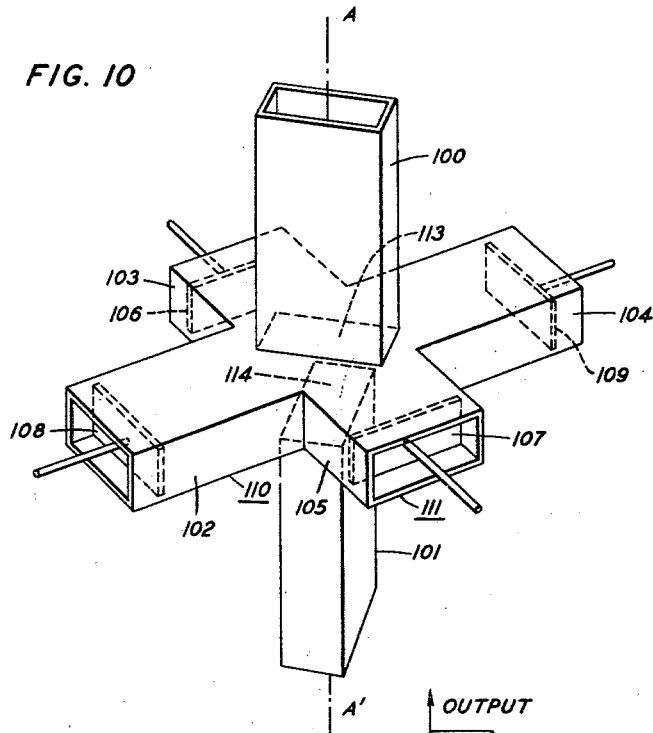
FIGS. 10 and 11 are equivalent waveguide structures of the bridge circuit of FIG. 8.

A waveguide structure equivalent of FIG. 9 is given in FIG. 10 and comprises an input guide 100, an output guide 101 (the terms "input" and "output" being relative terms since the network is bilateral) and the four stubs 102, 103, 104 and 105. To be a precise replica of the embodiment of FIG. 9, these four stubs would be of equal electrical length with two of the stubs being short-circuited and two of the stubs being open ended. However, because open ended stubs tend to radiate, it is preferable that all the stubs be terminated in a shortcircuit. The electrical equivalent of the open ended stubs is realized by making one pair of shorted stubs a quater wavelength longer than the other pair of stubs. Accordingly, the opposite stubs 103 and 105 are determined by means of conductive plungers 106 and 107, respectively, and the relative longitudinal position of each of these plungers is adjusted so that each stub has an electrical length $\theta$. The second pair of oppositely disposed stubs 102 and 104 are similarly terminated by means of conductive plungers 108 and 109, respectively. However, since these stubs are the equivalent of the open ended stubs of FIG. 9, the relative longitudinal position of plungers 108 and 109 are adjusted so that stubs 102 and 104 have an electrical length $$\theta + \frac{\pi}{2}$$

The input and output waveguides 100 and 101, comprising a first pair of intersecting guides, are aligned along a common longitudinal axis A–A'. As illustrated, these guides are hollow, conductively bounded rectangular waveguides whose wide internal cross-sectional dimension is between one-half to one wavelength of the energy to be propagated therein and whose narrow cross-sectional dimension is substantially one-half the wide dimension.

Guide 100 is rotated about the common longitudinal axis relative to guide 101 by an angle of ninety degrees. So rotated, the planes of the wide surfaces of guide 100 are perpendicular to the planes of the wide surfaces of guide 101.

Coupling between guides 100 and 101 is provided by means of the above-mentioned stubs 102, 104, and 103, 105 which comprise, respectively, the terminated ends of a second pair of intersecting rectangular guides 110 and 111. The guides 110 and 111 intersect at right angles to each other and have their wide surfaces lying in common planes. Waveguide 100 abuts the upper common surface of guides 110 and 111 and is electromagnetically coupled thereto by means of an aperture 113. Similarly, guide 101 abuts the lower common surface of the intersecting guides 110 and 111 and is electromagnetically coupled thereto by means of a second aperture 114. Axes A–A' and longitudinal axes of guides 110 and 111 intersect at a common point and are mutually perpendicular to each other. The resulting structure retains the essential characteristics of the all-pass network of FIGS. 8 and 9. However, because waveguides 100 and 101 have a cut-off frequency $\omega_{co}$, the $\varphi$-$\omega$ curve for the embodiment of FIG. 10 does not extend to zero frequency but, instead, reaches a minimum frequency $\omega_{co}$. This is indicated by the dotted extension 42 of curve 41 in FIG. 4. In all other respects, however, the analysis given above and to follow is applicable to the embodiments of FIGS. 8, 9 and 10.

Referring again to Equation (43), it will be noted that while tan 2Θ can be a linear function of frequency for small deviations in frequency about $F_0$, if the ratio $Z/Z_0$ is large enough, the phase shift $\phi$ of the network is not a linear function of frequency. Since it is our purpose to introduce a nonlinear phase delay and thereby correct for the second order phase delay introduced by the first order compensator and the transmission path $Z_0$, the characteristic impedance of the input and output lines can be reduced, where required, by means of a quarter wave transformer, to increase the ratio $Z/Z_0$.

With $2\Theta = K\pi$ at frequency $F_{02}$, we have:

$$\tan 2\Theta \approx 2\Theta \approx K\pi + 2\frac{\partial \Theta}{\partial F} \quad (44)$$

Expressing:

$$\Theta \text{ as } \frac{2\pi l_s}{\lambda_g}$$

where:

$l_s$ is the stub length and:

$\lambda_g$ the guide wavelength at a frequency F, and noting, in addition, that:

$$\frac{1}{\lambda_g^2} + \frac{1}{\lambda_{co}^2} = \frac{1}{\lambda^2} \quad (45)$$

where:

$\lambda_{co}$ is the guide cut-off wavelength
$\lambda$ is the free space wavelength at frequency F, we get for Q tan 2Θ

$$Q \tan 2\Theta = \frac{Z}{Z_0} \tan 2\Theta \approx G(F - F_{02}) \quad (46)$$

where:

$$G = \frac{Z}{Z_0} \frac{K\pi}{F_{02}} \left(\frac{\lambda_g}{\lambda}\right)^2 \quad (47)$$

Substituting in Equation (33)

$$\phi = \arctan G(F - F_{02}) \quad (48)$$

From Equation (2) we obtain for the delay ΔT $$\Delta T = \frac{\partial \varphi}{\partial \omega} = \frac{G}{2\pi} \frac{1}{1 + G^2(F - F_{02})^2} \quad (49)$$

The delay distortion of the first order is:

$$\frac{\partial \Delta T}{\partial G} dF = -\frac{G^2}{2\pi} \frac{2G(F - F_{02})}{[1 + G^2(F - F_{02})^2]^2} dF \quad (50)$$

The delay distortion of the second order is $$\frac{1}{2} \frac{\partial^2 \Delta T}{\partial F^2} (dF)^2 = \left[\frac{G^3}{4\pi}\right] \frac{6G^2(F - F_{02})^2 - 2}{[1 + G^2(F - F_{02})^2]^3} (dF)^2 \quad (51)$$

From an examination of Equation (50), it is observed that if the mean frequency F is made equal to $F_{02}$, the coefficient of dF is zero. Thus, the first order delay distortion introduced by the all-pass network of FIGS. 8 and 9 and the waveguide structure of FIG. 10 at the mean frequency and for small deviations about the mean frequency is small and does not substantially disturb the compensation produced by the helicoidal compensator of FIG. 3.

With respect to the second order distortion term given by Equation (51), we find that for $F = F_{02}$, the coefficient of $(dF)^2$ is a maximum and is negative. Thus, the second order distortion introduced by the all-pass network of FIGS. 8, 9 and 10 tends to reduce (because of its negative sign) the second order distortion introduced by the transmission line and the first compensator.

For $F = F_0$, Equation (51) can be rewritten as:

$$\frac{1}{2} \frac{\partial^2 \Delta T}{\partial F^2} (dF)^2 = -\frac{G^3}{2\pi} (dF)^2 = -\frac{2\mu \left(\frac{Z}{Z_0}\right)^3}{2\pi dF} \quad (52)$$

To compensate the delay distortion of 45 miles of two-inch circular waveguide, the helicoidal compensator introduces second order distortion of approximately one millimicrosecond. If it is assumed that $$\frac{Z}{Z_0} = 5$$

the corresponding value of $\mu$ needed to compensate for this magnitude of second order distortion is 0.1 radian. For so small a value of $\mu$, Equation (31) shows that there is substantially no attenuation of the signal.

Figure 11:
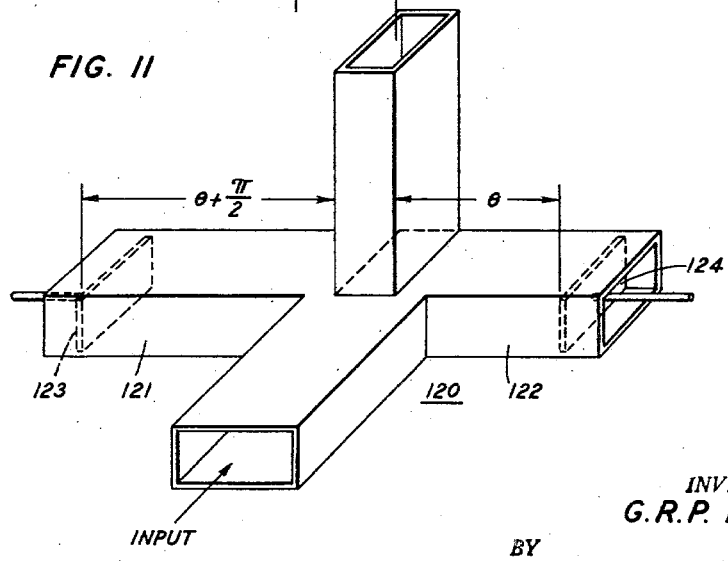

FIG. 11, shows an alternative embodiment of a second order compensator comprising a magic T type hybrid junction 120 having a pair of conjugate arms 121 and 122 that are terminated by means of shorting plungers 123 and 124, respectively. The electrical length of terminated arm 121 is adjusted by means of plunger 123 to be a quarter wavelength longer than the electrical length of arm 122. Because the embodiment of FIG. 11 has only two shorting plungers, it is easier to adjust than the embodiment of FIG. 10. However, its physical arrangement, for some applications is less convenient than that of FIG. 10.

In general, any hybrid junctions including such devices as a 3 db directional coupler can be used as a second order delay distortion compensator by terminating one pair of conjugate arms such that one of the terminated arms is a quarter wavelength longer than the other terminated arm at the frequency $\omega_{02}$. In systems propagating the circular electric mode, hybrid junctions of the type disclosed by E. A. J. Marcatili in the copending application Serial No. 77,928 filed December 23, 1960 can be used.

Figure 12:
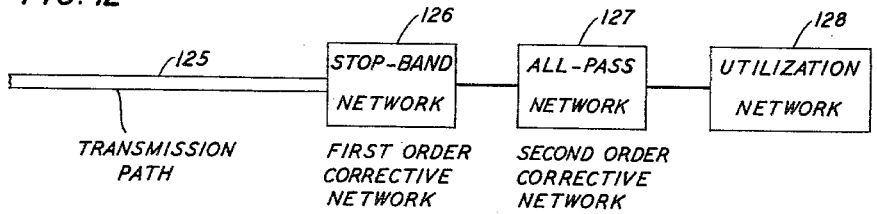
FIG. 12 shows, diagrammatically, a delay distortion corrected transmission system including first and second order corrective networks.

To summarize, FIG. 12 shows, diagrammatically, a delay distortion corrected transmission system, in accordance with the invention, comprising the transmission path 125, a first order corrective network 126, typically of the kind shown in FIG. 3, and a second order corrective network 127, typically of the kind shown in FIG. 10. The output from the second order corrective network is applied to the utilization network 128. FIGS. 13, 14, 15 and 16 show, more specifically, how the various compensators described hereinabove can be interconnected in accordance with the invention. For example, FIG. 13 shows a section of transmission path 130 made of rectangular waveguide connected to a first order of corrective network 131, which can be either the helicoidal structure of FIG. 3 or the comb structure of FIG. 5, and a second order corrective network 132 of the type shown in FIG. 10. The output from the second order corrective network is coupled to a second section of rectangular waveguide 133 for utilization locally or for further long distance transmission.

In FIG. 4 there is shown a similar arrangement comprising a transmission path 140, a first order corrective network 141, a second order corrective network 142 of the type shown in FIG. 11, and a second section of transmission path 143.

In systems using the circular electric mode of wave transmission in circular waveguides, a delay distortion compensator of the type shown in FIG. 6 would be used. Thus, in FIG. 15, a section of circular waveguide transmission path 150 is shown connected to a first order corrective network 151 of the type shown in FIG. 6. There is, in addition, shown a method of connecting a second order corrective network 153 of the type shown in either FIG. 10 or FIG. 11 of the system by interposing a mode converter 152 between the first order and second order corrective networks for converting the circular electric mode to the dominant rectangular mode of propagation. Devices of this type are well known. (See, for example, United States Patent 2,748,350.)

The embodiment shown in FIG. 16, is a further modification of the invention in which the original signal is shifted in frequency prior to being passed through the delay distortion compensators. Specifically, FIG. 16 shows a section of circular waveguide transmission path 160 coupled to a corrective network 162 of the type shown in FIG. 6 through a frequency converter 161. This is then followed by a mode converter 163, and a second order corrective network 164. In all cases, however, it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. In combination, a length of transmission path having a monotonically varying phase versus frequency characteristic over a band of operating frequencies, means connected to said path for equalizing the first order delay distortion produced by said path, said means comprising a network having a stop-band higher than said band of operating frequencies and a phase versus frequency characteristic which compensates that of the transmission path resulting in a combined phase versus frequency characteristic of said path and said network having an inflection point at a given frequency within said band of frequencies thereby producing a substantially linear phase versus frequency characteristic over a range of frequencies centered about said given frequency.

2. In combination, a guided wave transmission path having a monotonically varying phase shift versus frequency characteristic, means for equalizing the delay distortion of said wave path over a given frequency band extending from a first frequency to $f_1$ to a second higher frequency $f_2$ comprising a first network having a stop-band above frequency $f_2$ and a pass band which includes the frequencies between $f_1$ and $f_2$, said path and said network having a combined phase shift versus frequency characteristic which includes an inflection point at a frequency $f_{02}$ within said band, and an all-pass network whose phase shift versus frequency characteristic includes an inflection point at said frequency $f_{02}$.

3. The combination according to claim 2 wherein said stop-band network comprises a section of rectangular waveguide and a helically wound length of wire symmetrically supported within said waveguide on a core of low-loss dielectric material, said helix and said core being proportioned to series resonate at a frequency higher than $f_2$.

4. The combination according to claim 2 wherein said stop-band network comprises a section of rectangular waveguide and a plurality of transversely extending conductive posts longitudinally distributed along said waveguide, said posts being proportioned to series resonate at a frequency higher than $f_2$.

5. The combination according to claim 2 wherein said stop-band network comprises a section of circular waveguide and a plurality of circles of circumferentially spaced I-shaped conductive elements, each of said circles being conductively insulated from each other and longitudinally distributed along said waveguide to form a series resonant circuit whose resonant frequency is higher than $f_2$.

6. The combination according to claim 2 wherein said all-pass network compries a bridge network including one pair of opposite arms having substantially identical series resonant tuned circuits, and a second pair of opposite arms having substantially identical parallel resonant circuits, said arms adjusted to be simultaneously resonant at said frequency $f_{02}$.

7. The combination according to claim 2 wherein said all-pass network comprises a 3 db hybrid junction having two pairs of conjugate arms, and wherein the arms of one pair of conjugate arms is terminated by means of shorting members with one of said terminated arms being a quarter wavelength longer than the other of said terminated arms at frequency $f_{02}$.

8. In a transmission line propagating wave energy over a band of frequencies in one of the rectangular modes of wave propagation, a stop-band network comprising a section of rectangular waveguides, and a helically wound length of wire symmetrically supported within said waveguide on a core of low-loss dielectric material, said helix and said core forming a series resonant circuit whose resonant frequency falls within a preselected stop-band.

9. An all-pass network comprising a first pair of hollow rectangular waveguides having their longitudinal axes in alignment and their wide transverse dimensions normal to each other, a second pair of intersecting hollow rectangular waveguides having their longitudinal axes normal to each other and their wide transverse dimensions parallel to each other, said second pair of waveguides interposed between said first pair with the longitudinal axes of said first pair and the longitudinal axes of said second pair intersecting at a common point, means for coupling said first pair of guides to said second pair of guides, and means for terminating said second pair of guides.

10. An electromagnetic wave transmission system of length $l$ supportive of wave energy in the circular electric mode of wave propagation over a range of operating frequencies $f \pm df$, said system having a monotonically varying phase shift versus frequency characteristic, a frequency converter for translating said range of frequencies to a second range of frequencies $F \pm dF$, where $dF = df$, means for converting said wave energy from said circular electric mode to the $TE_{10}$ rectangular mode, and means for correcting the delay distortion of said system comprising a section of rectangular waveguide having a helically wound length of wire symmetrically supported within said waveguide on a core of low-loss dielectric material, said helix and said core forming a series resonate circuit whose resonant frequency is higher than $F + dF$ and whose phase shift versus frequency characteristic compensates that of said transmission system resulting in a combined phase shift versus frequency characteristic of said system and said correcting means having an inflection point at a frequency within said band $F \pm dF$.

11. The combination according to claim 10 wherein the length $l_1$ of said helix is related to the length $l$ of said system by $$\frac{l}{l_1}=\frac{3b^{1/2}f^3}{f_{co}^2 F}(x^2-x)x^{1/2}$$

where $f_{co}$ is the waveguide cut-off frequency,
$b$ is a dimensionless number $$x=\frac{1}{1-\left(\frac{F}{F_0}\right)^2}$$

and:

$F_0$ is the resonant frequency of said helix.

References Cited by the Examiner
UNITED STATES PATENTS

| | | | |
|---|---|---|---|
| 2,445,895 | 7/48 | Tyrrell | 333—11 |
| 2,445,896 | 7/48 | Tyrrell | 333—11 |
| 2,626,990 | 1/53 | Pierce | 333—28 |
| 2,633,492 | 3/53 | Ring | 333—28 |
| 2,639,326 | 5/53 | Ring | 333—28 |
| 2,717,956 | 9/55 | Eglin | 333—28 |
| 2,760,164 | 8/56 | Graham | 333—28 |
| 2,816,270 | 12/57 | Lewis | 333—73 |
| 2,859,413 | 11/58 | Ketchledge | 333—28 |
| 2,863,126 | 12/58 | Pierce | 333—28 |
| 2,863,127 | 12/58 | Albersheim | 333—28 |
| 2,892,126 | 6/59 | Bennett | 333—28 |
| 2,929,032 | 3/60 | Miller | 333—73 |
| 2,951,996 | 9/60 | Pan | 333—9 |
| 2,978,657 | 4/61 | Marcuse | 333—31 |
| 2,991,431 | 7/61 | Miller | 333—73 |

ELI LIEBERMAN, *Acting Primary Examiner*.

HERMAN KARL SAALBACH, BENNETT G. MILLER, *Examiners*.